United States Patent
Lim et al.

(10) Patent No.: US 10,606,918 B2
(45) Date of Patent: Mar. 31, 2020

(54) CONFIGURABLE CONVOLUTION ENGINE

(71) Applicant: Apple Inc., Cupertino, CA (US)

(72) Inventors: Suk Hwan Lim, Mountain View, CA (US); Junji Sugisawa, Santa Clara, CA (US); Muge Wang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/664,096

(22) Filed: Oct. 25, 2019

(65) Prior Publication Data

US 2020/0057789 A1 Feb. 20, 2020

Related U.S. Application Data

(63) Continuation of application No. 15/823,292, filed on Nov. 27, 2017, now Pat. No. 10,489,478, which is a continuation of application No. 15/198,478, filed on Jun. 30, 2016, now Pat. No. 9,858,636.

(51) Int. Cl.
| | |
|---|---|
| *G06F 17/15* | (2006.01) |
| *G06T 1/20* | (2006.01) |
| *G06T 5/00* | (2006.01) |
| *G06T 5/20* | (2006.01) |

(52) U.S. Cl.
CPC .............. *G06F 17/153* (2013.01); *G06T 1/20* (2013.01); *G06T 5/001* (2013.01); *G06T 5/20* (2013.01)

(58) Field of Classification Search
None
See application file for complete search history.

(56) References Cited

U.S. PATENT DOCUMENTS

| | | | |
|---|---|---|---|
| 4,399,536 A | 8/1983 | Metz | |
| 4,694,407 A | 9/1987 | Ogden | |
| 5,809,182 A * | 9/1998 | Ward | ................. G06T 3/4007 382/260 |
| 6,118,902 A | 9/2000 | Knowles | |
| 6,539,120 B1 | 3/2003 | Sita et al. | |
| 6,775,257 B1 | 8/2004 | Watanabe | |
| 6,993,208 B2 | 1/2006 | Matsumoto | |
| 7,071,944 B2 | 7/2006 | MacInnis et al. | |
| 7,266,255 B1 | 9/2007 | Wasserman et al. | |

(Continued)

OTHER PUBLICATIONS

Feichtenhofer, C. et al. "Convolutional Two-Stream Network Fusion for Video Action Recognition," 2016 IEE Conference on Computer Vision and Pattern Recognition, Jun. 27, 2016, pp. 1933-1941.

(Continued)

*Primary Examiner* — Joni Richer
(74) *Attorney, Agent, or Firm* — Fenwick & West LLP

(57) ABSTRACT

Embodiments of the present disclosure relate to a configurable convolution engine that receives configuration information to perform convolution or its variant operations on streaming input data of various formats. To process streaming input data, input data of multiple channels are received and stored in an input buffer circuit in an interleaved manner. Data values of the interleaved input data are retrieved and forwarded to multiplier circuits where multiplication with a corresponding filter element of a kernel is performed. Varying number of kernels with different sizes and sparsity can also be used for the convolution operations.

20 Claims, 9 Drawing Sheets

(56) References Cited

U.S. PATENT DOCUMENTS

| | | | |
|---|---|---|---|
| 7,379,105 B1* | 5/2008 | Frank | H04N 5/232 |
| | | | 348/242 |
| 7,653,088 B2 | 1/2010 | Marko | |
| 7,737,994 B1 | 6/2010 | Wasserman et al. | |
| 8,345,984 B2 | 1/2013 | Ji et al. | |
| 8,824,833 B2 | 9/2014 | Dagher et al. | |
| 8,917,952 B2 | 12/2014 | Yang | |
| 8,983,188 B1 | 3/2015 | Lang et al. | |
| 9,342,749 B2 | 5/2016 | Li et al. | |
| 9,858,636 B1 | 1/2018 | Lim et al. | |
| 10,169,295 B2 | 1/2019 | Du et al. | |
| 10,176,551 B2 | 1/2019 | Park et al. | |
| 2005/0041869 A1 | 2/2005 | Cathier | |
| 2006/0104236 A1 | 5/2006 | Cho | |
| 2006/0215929 A1 | 9/2006 | Fresneau et al. | |
| 2008/0151083 A1 | 6/2008 | Hains et al. | |
| 2009/0077359 A1* | 3/2009 | Chakravarthula | G06F 17/153 |
| | | | 712/229 |
| 2009/0128666 A1 | 5/2009 | Rappaport et al. | |
| 2013/0322501 A1 | 12/2013 | Takeuchi et al. | |
| 2015/0172547 A1* | 6/2015 | Wang | G06T 5/003 |
| | | | 348/208.4 |
| 2016/0037044 A1 | 2/2016 | Motta et al. | |
| 2016/0267324 A1 | 9/2016 | Shoaib et al. | |
| 2016/0283818 A1 | 9/2016 | Liu et al. | |
| 2016/0295158 A1 | 10/2016 | Van Belle | |
| 2016/0328644 A1* | 11/2016 | Lin | G06N 3/08 |
| 2016/0379073 A1* | 12/2016 | Pan | G06K 9/00986 |
| | | | 382/279 |
| 2018/0005344 A1 | 1/2018 | Lim et al. | |
| 2018/0082400 A1 | 3/2018 | Lim et al. | |
| 2018/0137084 A1 | 5/2018 | Du et al. | |
| 2018/0315153 A1 | 11/2018 | Park | |
| 2018/0315154 A1 | 11/2018 | Park et al. | |
| 2018/0315155 A1 | 11/2018 | Park et al. | |

OTHER PUBLICATIONS

Karpathy, A. et al. "Large-Scale Video Classification with Convolutional Neural Networks," 2014 IEEE Conference on Computer Vision and Pattern Recognition, Jun. 23, 2014, pp. 1725-1732.

Krizhevsky. A. et al. "ImageNet 1-20 classification with deep convolutional neural networks", Communications of the Association for Computing Machinery, 2012, vol. 6, No. 6, pp. 84-90, Dec. 2012.

PCT International Search Report and Written Opinion, PCT Application No. PCT/US2018/021210, dated Jul. 26, 2018, 18 pages.

PCT International Search Report and Written Opinion, PCT Application No. PCT/US2018/021227, dated Jul. 10, 2018, 17 pages.

PCT International Search Report and Written Opinion, PCT Application No. PCT/US2018/021388, dated Jul. 10, 2018, 18 pages.

Qin, H. et al. "Joint Training of Cascaded CNN for Face Detection," 2016 IEEE Conference on Computer Vision and Pattern Recognition, Jun. 27, 2016, pp. 3456-3465.

Schroff, F. et al. "FaceNet: A unified embedding for face recognition and clustering," 2015 IEEE Conference on Computer Vision and Pattern Recognition, Jun. 7, 2015, pp. 815-823.

Simonyan, K. et al. "Two-Stream Convolutional Networks for Action Recognition in Videos," Advances in neural information processing systems, 2014, nine pages, Jun. 2014.

United States Office Action, U.S. Appl. No. 15/198,478, dated Mar. 20, 2017, 15 pages.

Zeiler, M. et al. "Visualizing and Understanding Convolutional Networks," Proceedings of 18.sup.th International Conference on Medical image computer and computer-assisted intervention, Oct. 2015, pp. 818-833.

United States Office Action, U.S. Appl. No. 15/823,292, dated May 29, 2019, seven pages.

United States Office Action, U.S. Appl. No. 15/823,292, dated Apr. 19, 2019, 16 pages.

* cited by examiner

Sparse X = 1
Sparse Y = 1         700A 1 1 1
1 0 1
1 1 1

Sparse X = 2
Sparse Y = 2         700B

1 X 1 X 1
X X X X X
1 X 0 X 1
X X X X X
1 X 1 X 1

Sparse X = 3
Sparse Y = 1         700C

1 X X 1 X X 1
1 X X 0 X X 1
1 X X 1 X X 1

Sparse X = 2
Sparse Y = 1         700D

1 X 1 X 1
1 X 0 X 1
1 X 1 X 1

| Output Buffer 524 | | | | | |
|---|---|---|---|---|---|
| CH0(0,0) | CH1(0,0) | CH2(0,0) | CH0(1,0) | CH1(1,0) | CH2(1,0) |
| CH0(0,1) | CH1(0,1) | CH2(0,1) | CH0(1,1) | CH1(1,1) | CH2(1,1) |

*FIG. 9*

CONFIGURABLE CONVOLUTION ENGINE

CROSS REFERENCE TO RELATED APPLICATION

This application is a continuation of U.S. patent application Ser. No. 15/823,292, titled "Configurable Convolution Engine", filed Nov. 27, 2017, which is a continuation of U.S. patent application Ser. No. 15/198,478, titled "Configurable Convolution Engine", filed Jun. 30, 2016, now U.S. Pat. No. 9,858,636, which are incorporated by reference in their entirety.

BACKGROUND

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

Various types of image processing involves convolution between a kernel and data. Different kernels may be used to, for example, blur, sharpen, emboss or perform edge detect in the image. Such convolution operations are generally performed by the CPU which reduces its availability for other processes.

SUMMARY

Embodiments relate to a configurable convolution engine for performing convolution of input data of various channels in a desired manner by configuring operations of the components in the convolution engine. The convolution engine may include an input buffer circuit, a datapath switch circuit, a filter switch circuit and a computation core circuit. The input buffer circuit receives and stores interleaved data values of a plurality of channels of input data in an interleaved manner. The datapath switch circuit retrieves at least a subset of the data values from the input buffer circuit. The filter switch circuit retrieves filter elements of at least one kernel for performing a convolution operation. The computation core circuit receives the at least subset of data values from the datapath switch and the retrieved filter elements from the filter switch, multiplies each of the data values with a corresponding filter element to obtain multiplied values, and processes subsets of multiplied values to obtain output values.

BRIEF DESCRIPTION OF THE DRAWINGS

FIG. 9 is a diagram illustrating storing of output values of convolution in designated locations of an output buffer, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a configurable convolution engine that receives configuration information to perform convolution or its variant operations on streaming input data of various formats. To process streaming input data, input data of multiple channels are received and stored in an input buffer circuit in an interleaved manner. Data values of the interleaved input data are retrieved and forwarded to multiplier circuits where multiplication with corresponding filter elements of a kernel is performed. Varying number of kernels with different sizes and sparsity can also be used for the convolution operations.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used.

In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
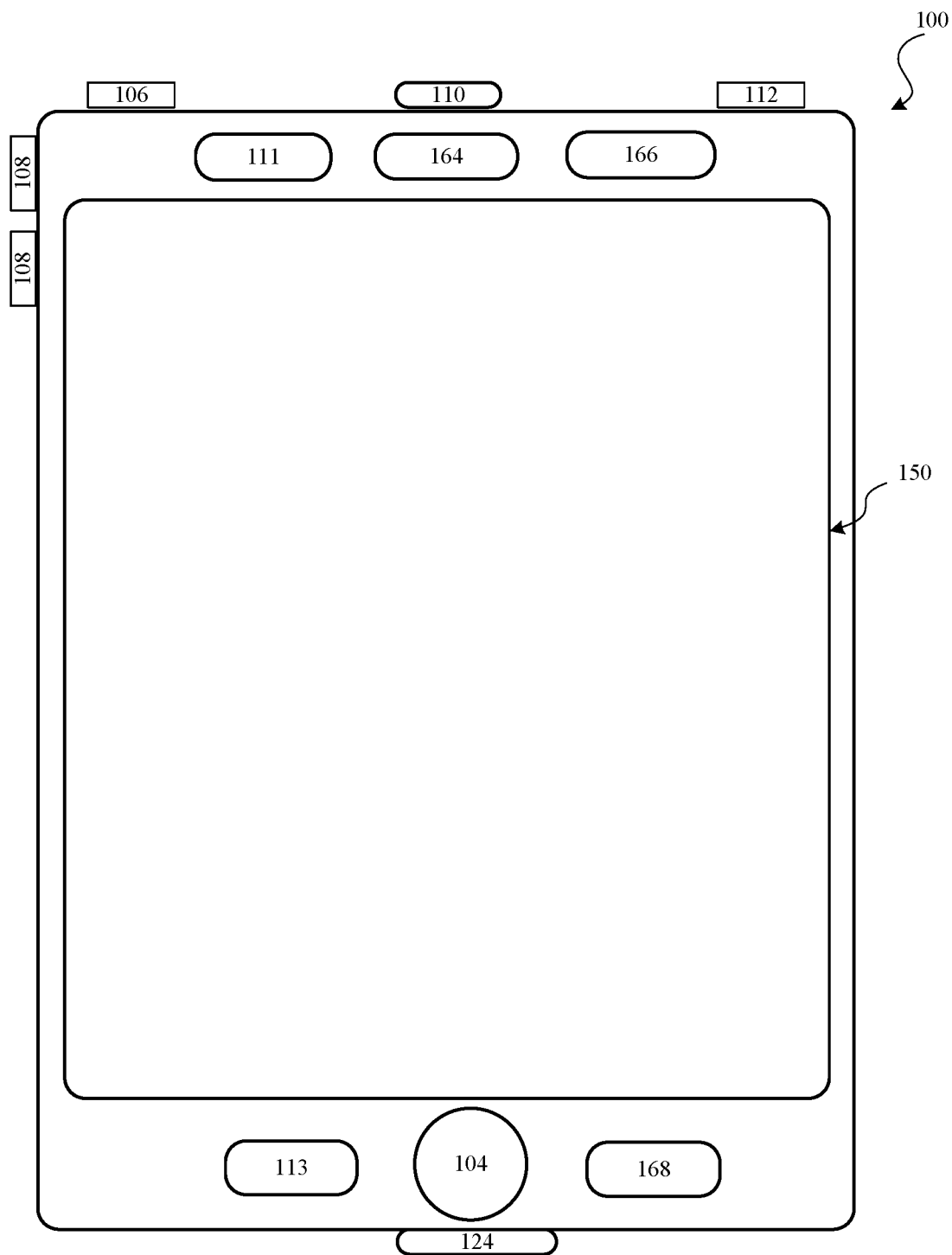
FIG. 1 is a high-level diagram of an electronic device, according to one embodiment

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
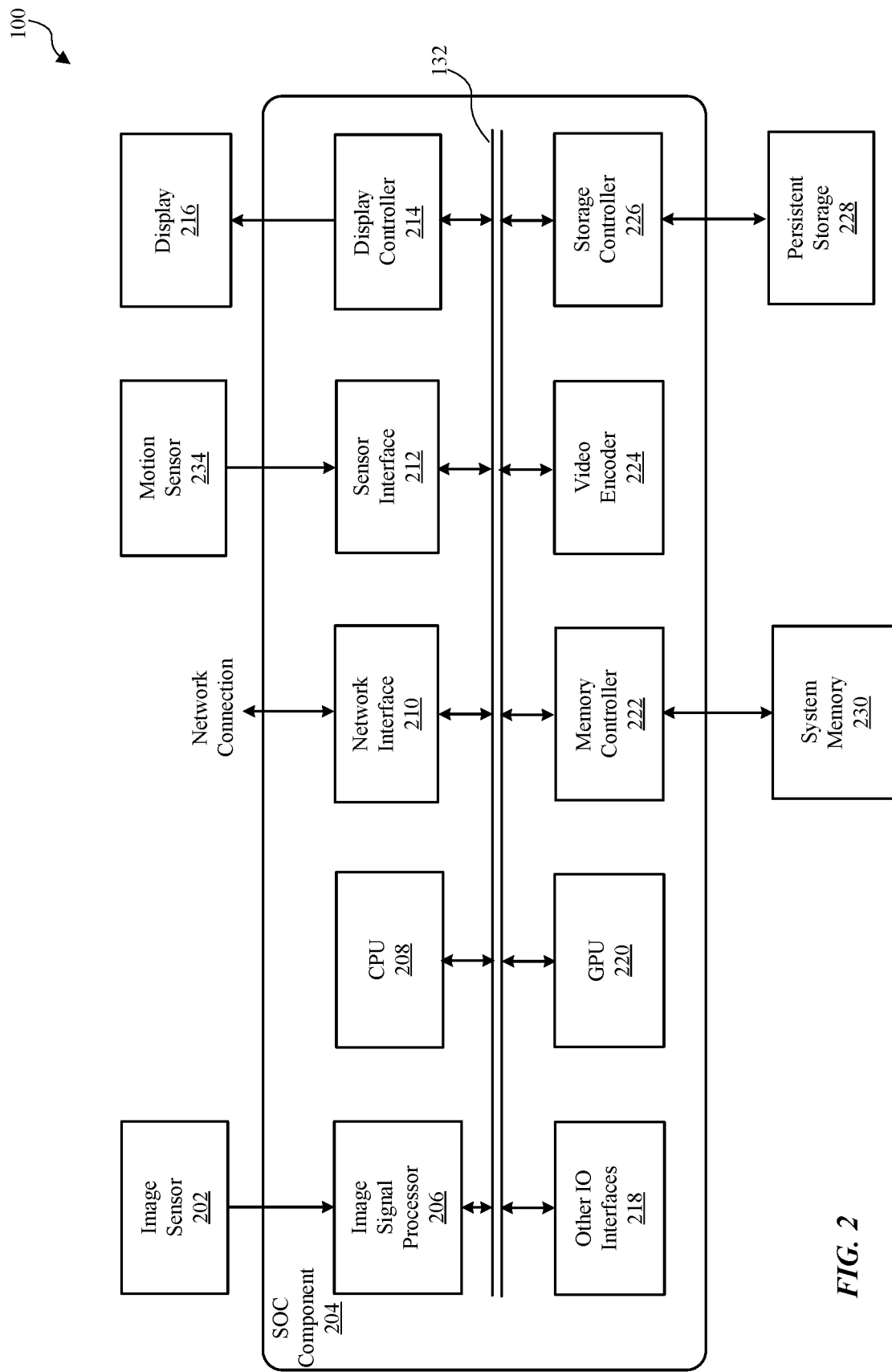
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 106 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 108 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
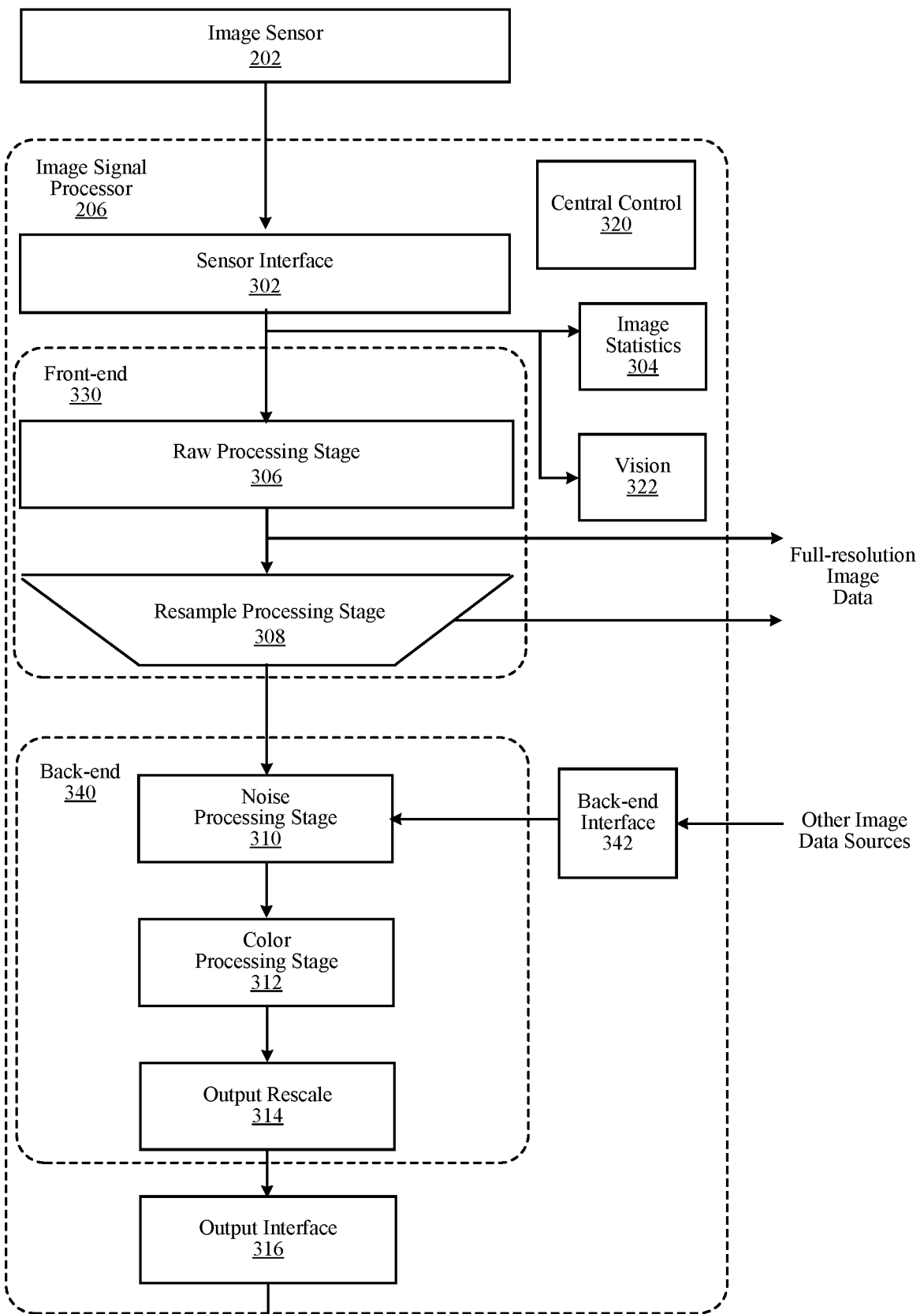
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to image sensor 202 to receive raw image data. ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, and output interface 316. ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 308 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 308 may process image data in a Bayer raw format.

The operations performed by raw processing stage 308 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 308 may process image data in the full-color domain in addition to or instead of raw image data.

Resample processing stage 308 performs various operations to convert, resample, or scale image data received from raw processing stage 306. Operations performed by resample processing stage 308 may include, but are not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform special image effects, including black and white conversion, sepia tone conversion, negative conversion, or solarize conversion. For the purpose of Gamma mapping, lookup tables (or other structures that index pixel values to another value) for different color components or channels of each pixel (e.g., a separate lookup table for Y, Cb, and Cr color components) may be used. Color space conversion refers to converting color space of an input image data into a different format. In one embodiment, resample processing stage 308 converts RBD format into YCbCr format for further processing.

Central control 320 may control and coordinate overall operation of other components in ISP 206. Central control 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control 320 may update programmable parameters for other components in ISP 206 while the other components are in an idle state. After updating the programmable parameters, central control 320 may place these components of ISP 206 into a run state to perform one or more operations or tasks. Central control 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, mask patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), auto focus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. Although only a single statistics module 304 is illustrated in FIG. 3, multiple image statistics modules may be included in ISP 206. In such embodiments, each statistic module may be programmed by central control 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, convolution and generation of histogram-of-orientation gradients (HOG). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing cameral pose and object tracking. Keypoint detection refers to the process of identifying such keypoints in an image. Convolution is heavily used tools in image/video processing and machine vision. Convolution may be performed, for example, to generate edge maps of images or smoothen images. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations.

Back-end interface 342 receives image data from other image sources than image sensor 202 and forwards it to other components of ISP 206 for processing. For example, image data may be received over a network connection and be stored in system memory 230. Back-end interface 342 retrieves the image data stored in system memory 230 and provide it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 314 to various other components of system 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Vision Module

Figure 4:
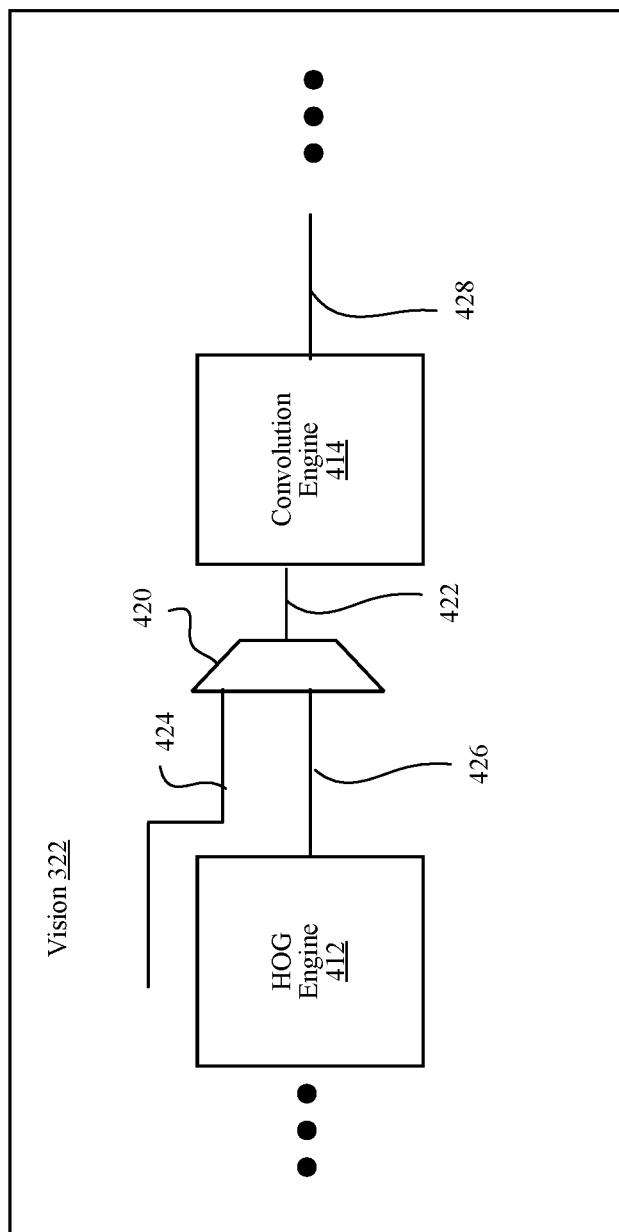
FIG. 4 is a block diagram illustrating a vision module in the image signal processor, according to one embodiment.

FIG. 4 is a block diagram illustrating a vision module 322 in the ISP 206, according to one embodiment. The vision module 322 performs various operations to facilitate computer vision operations at CPU 208, as described above with reference to FIG. 3. For this purpose, the vision module 322 may include, among other components, a histogram of oriented gradients (HOG) module 412, a multiplexer 420 and a convolution engine 414. The vision module 322 may include other components not illustrated in FIG. 4 such as a scaling module.

The HOG engine 400 processes images to generate HOG data 426 for each image. An example of HOG data 426 is a histogram-of-oriented gradients that is generated for an image based on identified gradient orientations within the image. The HOG data 426 can be used in various computer vision applications such as image classification, scene detection, facial expression detection, human detection, object detection, scene classification, and text classification.

The multiplexer 420 receives the HOG data 426 from the HOG engine 412 and pixel data 424 from a component of image processing processor 206 other than the HOG engine 412 (e.g., DRAM memory), and selects either HOG data 426 or pixel data 424 as input data 422 to be forwarded to the convolution engine 414 according to various modes of operation. In one mode, the multiplexer 420 may forward the HOG data 426 to the convolution engine 414 as the input data 422. In another mode, the multiplexer 420 may forward the pixel data 424 to the convolution engine 414 as the input data 422 for performing operations such as sharpening, blurring and edge detection. A configuration signal for controlling the multiplexer 420 may be received from the central control 320. The pixel data 424 may be interleaved with pixel values of multiple channels, as described below in detail with reference to FIG. 6.

The convolution engine 414 is a configurable circuit that performs convolution operations on the input data 422 based at least on sparsity values and step values. For this purpose, the convolution engine 414 includes components for storing kernel information, for performing calculation and for accumulating the multiplied values to generate an output 428, as described below in detail with reference to FIG. 5.

The structure of vision module 322 as illustrated in FIG. 4 is merely illustrative and various changes may be made to the structure of FIG. 4. For example, components such as HOG engine 412 and the multiplexer 420 may be omitted. Alternatively, the multiplexer 420 may receive pixel data from more than two sources and select one source to provide the input data 422.

In the following description, it is assumed that the input data 422 is pixel values for the sake of explanation. But it is to be noted that the input data 422 may be other types of data (e.g., HOG data) suitable for the convolution operation.

Example Convolution Engine Architecture

Figure 5:
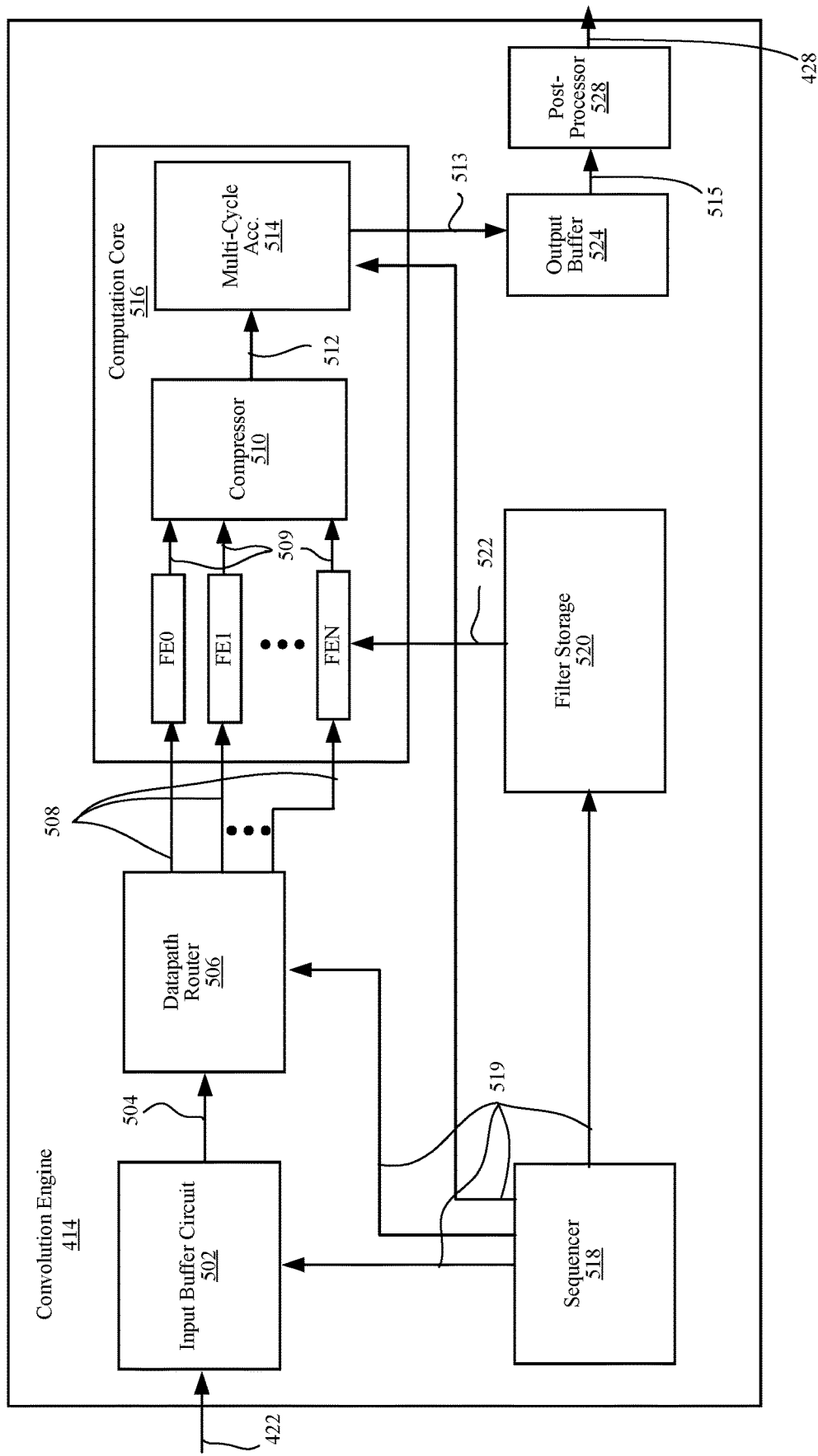
FIG. 5 is a block diagram of a convolution engine in the vision module, according to one embodiment.

FIG. 5 is a block diagram of the convolution engine 414, according to one embodiment. The convolution engine 414 receives the input data 422, performs the convolution operation on the input data 422 based on stored kernel information, processes the outcome of the convolution operation, and generates the output 428. For this purpose, the convolution engine 414 may include, among other components, an input buffer circuit 502, a datapath router 506, a computation core 516, a sequencer 518, a filter storage 520, an output buffer 524, and a post-processor 528.

The input buffer circuit 502 is a circuit that stores the input data 422 as it is streamed into the convolution engine 414. In one embodiment, the input data 422 is streamed with data of multiple input channels, as described below in detail with reference to FIG. 6. The input data 422 may be pixel data, HOG data, output 428 of a previous cycle of the convolution engine 414, or other processed data received from other components of the ISP 206.

Datapath router 506 is a circuit that reads a set of data in predetermined locations of the input buffer circuit 502 and sends the read data 508 to the computation core 516 for computation of convolved values. The datapath router 506 may perform reading and sending of data to populate the computation core 516 with pixel values. In one embodiment, the datapath router 506 selectively reads the pixel values of a center pixel and pixel values for a subset of pixels neighboring the center pixel while skipping other neighboring pixels according to sparsity values, as described below in detail with reference to FIGS. 7A through 8C. Furthermore, the center pixels to be processed may be separated by a number of pixels defined by the step values, as described below in detail with reference to FIG. 8A through 8C. In a subsequent scan, a new set of center pixels separated by the same or different number of pixels may be processed.

The filter storage 520 is a circuit that stores kernel information. The kernel information includes values for filter elements in kernels. The kernel information 522 is sent to computation core 516 to populate register in multiplier circuits FE0 through FEN of the computation core 516. The filter storage 520 may include a plurality of filters for performing convolution with different channels of pixel data and/or to perform convolution with the same channel of pixel data.

The computation core 516 is a programmable circuit that performs computation operations. For this purpose, the computation core 516 may include the multiplier circuits FE0 through FEN, a compressor 510 and a multi-cycle accumulator 514. Each of the multiplier circuits FE0 through FEN may store a pixel value in the read data 508 and a corresponding filter element value in the kernel information 522. The pixel value and the corresponding filter element value are multiplied in the multiplier circuit to generate a multiplied value 509. Instead of performing multiplication between pixel values and filter element values, other types of operations can be selected, such as addition, subtraction, absolute difference, distance transform, etc. In one embodiment, the compressor 510 receives the multiplied values 509 and accumulates subsets of multiplied values 509 to generate compressed values 512. In other embodiments, instead of accumulating the subsets of multiplied values 509, the compressor 510 may select (i) a minimum value, (ii) a maximum value, or (iii) a median value from each subset of multiplied values 509. The multi-cycle accumulator 514 receives the compressed values 512 and performs accumulation (or selection of a minimum value, a maximum value or a media value) on the compressed values 512 generated across multiple processing cycles of the convolution engine 414.

Sequencer 518 controls operations of other components of the convolution engine 414 to perform multiple cycles of operations. The size of the input data and/or the number or the size of kernels may be too large for the computation core 516 to perform all the computation in a single processing cycle of the convolution engine 414. In such a case, the sequencer 518 divides up the computation operations into multiple batches and performs computation based on a subset of input data or a subset of kernels in a single cycle. The computed results in each cycle are processed by the multi-cycle accumulator 514 to generate the output values 513 across the multiple cycles. To configure the other components to perform multi-cycle operation, the sequencer 518 sends multi-cycle control signals 519 to other components.

The output buffer 524 is a circuit that stores output values 513 in its designated locations. In one embodiment, a series of output values for multiple output channels are interleaved in the output buffer 524. In operations where the output values 515 of the convolution engine 414 are again fed back as the input data 422 of the convolution engine 414, the data in the output buffer 524 may be copied to the input buffer circuit 502 for the next cycle of convolution operation. In some embodiments, the output buffer 524 may be or be a part of a storage element, such as a memory device, storage flops, registers and the like.

The post-processor 528 is a circuit that performs further processing of output values stored in the output buffer 524. In one embodiment, the post-processor 528 may combine horizontally interleaved neighbors to produce 16 bit data. In another embodiment, the post-processor 528 may combine two or more output channels. Such operations may include, but not limited to, computing variance of input image at various locations, covariance between an image and a kernel, normalized cross-correlation, merging the results of 8 bit pixel data convolution into 16 bit data output, and performing the results of using 8 bit kernels into 16 bit data output The components in the convolution engine 414 may be configured during a configuration period by receiving configuration information from the central control 320. The configurable parameters and modes as instructed in the configuration information may include, but are not limited to, sparsity values, step values, mapping between pixel data values and filter elements, the type of operations to be performed between the pixel data values and filter elements (e.g., multiplication, addition, subtraction, absolute difference and distance transform) at the in the computation core 516, the type of operations to be performed at compressor 510 (e.g., accumulate, min, max or median), the number of channels in input data or output values, and enabling/selection of post-processing operations to be performed at the post processor 528.

The structure of the convolution engine in FIG. 5 is merely illustrative. For example, the multi-cycle accumulator 514 and the sequencer 518 may be omitted so that only a single cycle operation is performed at the convolution engine. Moreover, post-processor 528 may be omitted and output values 515 can be sent to other components of the ISP 206 for further processing.

Example Convolution Engine Architecture

Figures 6, 7A, 7B, 7C, 7D:
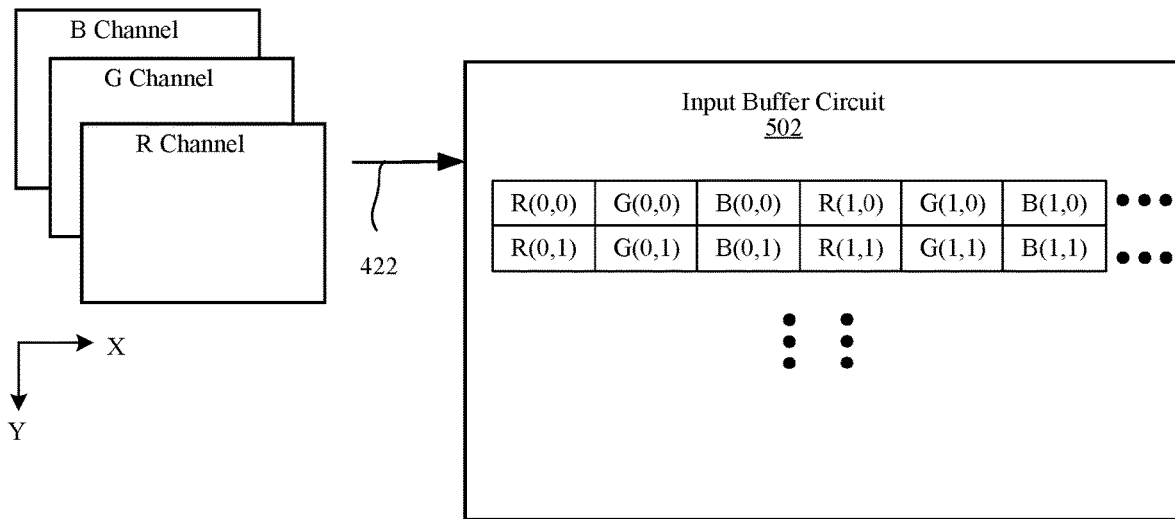
FIG. 6 is a conceptual diagram illustrating interleaved pixel values of RGB channels stored in an input buffer circuit of the convolution engine, according to one embodiment.
FIGS. 7A through 7D are diagrams illustrating kernels with different sparsity values, according to embodiments.

FIG. 6 is a conceptual diagram illustrating interleaved pixel values of red (R), green (G) and blue (B) channels stored in the input buffer circuit 502 of the convolution engine 414, according to one embodiment. As illustrated in FIG. 6, the input data 422 includes pixels of three channels: R channel, G channel and B channel. The input data 422 is interleaved so that pixel data for R channel R(0, 0) is followed by pixel data for G channel G(0, 0), which is again followed by pixel data for B channel B(0, 0). After the pixel data for B channel B(0, 0), the pixel location is shifted right and the pixel data for R channel R(1, 0), G channel G(1, 0) and B channel B(1, 0) follows again in this sequence. After one row of pixel data for R, G and B channels are received in the input data 422, the next row of pixel data for R, G and B channel R(0, 1), G(0, 1), B(0, 1), R(1, 1), etc., again follows in the same sequence.

The input buffer circuit 502 stores the pixel data as they are received in the input data 422. Accordingly, the input buffer circuit 502 stores pixel data for channels and pixel locations as illustrated in FIG. 6.

Receiving and storing multiple channel data in an interleaved manner in the input buffer circuit 502 is advantageous, among other reasons, because (i) the storage size of the input buffer circuit 502 for performing streaming operation of pixel data can be reduced, (ii) the color channels of image data may be interleaved, and (iii) the output from the sensor interface 302 can be received directly at the convolution engine 414.

Similarly, the output buffer 524 also stores the output values for multiple output channels in an interleaved manner. In this way, the sequential reading of output values in the output buffer 524 results in data output where data values of multiple output channels are interleaved. Such interleaved storing of the output values for multiple channels is advantageous, among other reasons, because the output can be fed into the convolution engine 414 directly for a subsequent layer of processing in multiple layer processing where previous output from the convolution engine 414 becomes the input to the convolution engine 414 for a subsequent round of processing.

Example Kernels Based on Sparsity Values

FIGS. 7A through 7D are diagrams illustrating kernels with different sparsity values, according to embodiments. FIG. 7A illustrates a 3×3 kernel 700A where the sparsity values in X and Y directions are both 1. When such a kernel is used, the datapath router 506 retrieves pixel values for all pixels neighboring a center pixel and sends them to the computation core 516 for the convolution operation. Specifically, the center pixel and neighboring pixels (i.e., a pixel above the center pixel, a pixel below the center pixel, a pixel to the right side of the center pixel, a pixel to the left side of the center pixel, a pixel at the upper right side of the center pixel, a pixel at the upper left side of the center pixel, a pixel at the bottom right side of the center pixel and a pixel at the bottom left side of the center pixel) are retrieved and sent to the computation core 516.

FIG. 7B illustrates a 5×5 kernel 700B expanded from the kernel 700A of FIG. 7A. In FIG. 7B, "X" represents a filter element which is not used for calculating the output value of the convolution computation. That is, filter elements indicated by "X" and their counterpart pixel data are disregarded during the convolution operation. Because "X" appears every other filter element in X direction, the sparsity value of kernel 700B in X direction is 2. Every odd line includes only "X" filter elements, and hence, the sparsity value of kernel 700B in Y direction is also 2.

When kernel 700B is used, the datapath router 506 may forward pixel data for pixels to be multiplied with non-X values in the kernel 700B to the computation core 516 when performing the convolution operation of an input pixel. That is, the datapath router 506 sends only the pixel values for pixels that are to be multiplied with non-X valued filter elements. In this way, unnecessary storing of pixel data and multiplication operations based on the filter elements of "X" value can be omitted in the computation core 516.

FIG. 7C illustrates a 7×3 kernel 700C that is expanded from the kernel 700A of FIG. 7A. Kernel 700C has filter elements with "X" values in the second, third, fifth and sixth columns of the filter (and hence, the sparsity value in X direction is 3). As described above with reference to FIG. 7B, when kernel 700C is being used, the datapath router 506 forwards pixel data for pixels to be multiplied with non-X values in the kernel 700C to the computation core 516 when performing the convolution operation of an input pixel.

FIG. 7D illustrates a 5×3 kernel 700C that is expanded from the kernel 700A of FIG. 7A. Kernel 700C has "X" filter elements in each odd columns of the filter (and hence, the sparsity value in X direction is 2). As described above with reference to FIG. 7B, when kernel 700C is being used, the datapath router 506 forwards pixel data for pixels to be multiplied with non-X values in the kernel 700D to the computation core 516 when performing the convolution operation of an input pixel.

The uses of kernels 700A, 700C and 700D in the context of different step values are described below in detail with reference to FIGS. 8A through 8C.

Example Convolution Operations Based on Step Values

By using different combinations of sparse values and steps values, convolution operations on data for different numbers of input data channels in various ways may be performed according to the configuration information generated by the central control 320. Such flexible configurability enables various operations to be performed using the same convolution engine 414.

Figure 8A:
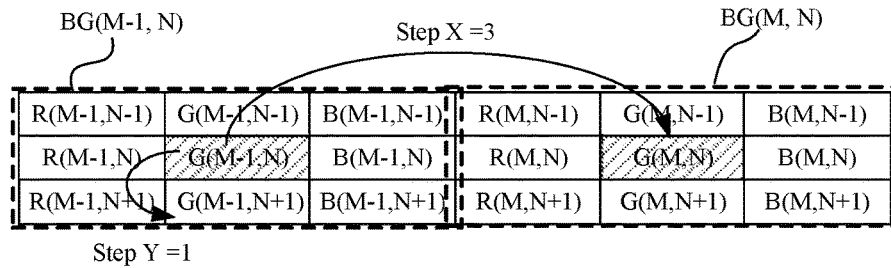
FIGS. 8A and 8B are diagrams illustrating selection of pixels according to step values, according to embodiments.

FIG. 8A is a diagram illustrating performing of convolution with the step value of 3 in X direction and the step value of 1 in Y direction, according to one embodiment. The step values indicate the distance between the center pixels. Because the step value in X direction is 3 which is identical to the number of color channels in the input data, red pixels R(M−1, N−1), R(M, N−1), R(M+1, N−1) . . . R(M−1, N), R(M, N), R(M, N) . . . R(M−1, N+1), R(M, N+1), R(M+1, N+1) (where M and N represents integers) and so forth are used as the center pixels for performing the convolution operation based on neighboring red, blue and green pixels. That is, in the example of FIG. 8A, only red pixels are used as the center pixels for the convolution operation.

In the example of FIG. 8A where all three colored pixels are used for performing the convolution operation of a center pixel, a kernel with sparsity value of 1 in X direction and sparsity value of 1 in Y direction may be used because a center pixel and all 8 neighboring pixels (red, blue and green pixels) are used for performing the convolution operation. For example, kernel 700A may be used for multiplying filter elements with 9 pixels and then accumulating the output values to perform the convolution operation.

Figure 8B:
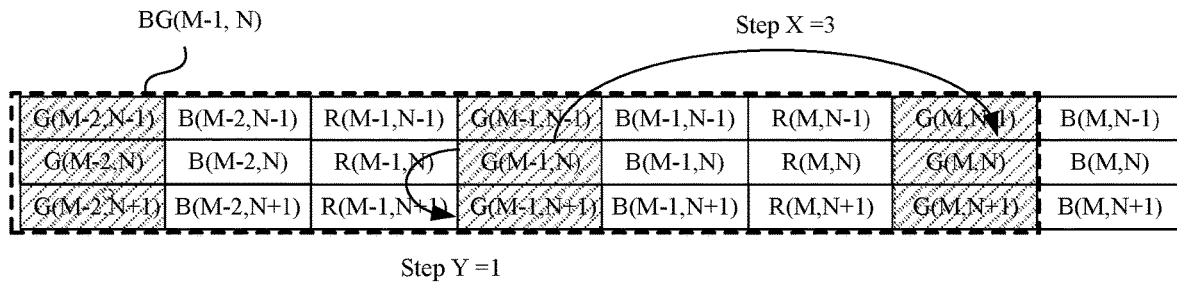

FIG. 8B is a diagram illustrating performing of convolution with the step value of 3 in X direction and the step value of 1 in Y direction where only pixels having a color the same as the center pixel are used for computing the output values, according to one embodiment. The sequence of assigning the center pixels are the same as the example of FIG. 8A, but a subset of pixel blocks 7×3 including a center pixel is used for multiplying and accumulation operations. For example, when green pixel G(M−1, N) is the center pixel, 9 shaded pixels of the 21 pixels in block BG(M−1, N) are used for computing the output value. For the operation of using only pixels of the same color as the center pixel in the convolution operation, kernel 700C of FIG. 7C having sparsity value of 3 in X direction and sparsity value of 1 in Y direction may be used.

Another use case of the step values and the sparsity is for processing 16 bit data when the computation core 516 is designed to process only 8 bit data. To process input data of 16 bit, each input data is first divided into two 8 bit data portions: One data portion is 8 bit image data including 8 most significant bits (MSB) and the other data portion includes 8 least significant bits (LSB). FIG. 8C illustrates an example arrangement where the 8 MSB data are stored in odd lines, and the 8 LSB data are stored in even lines of the input buffer circuit 502.

MSB data portions are sent to the computation core 516 by the datapath router 506 for the convolution operation with filter elements of a kernel. LSB data portions are then sent to the computation core 516 by the datapath router 506 for the convolution operation with the same filter elements of the kernel. The corresponding output values obtained by performing the convolution operation on the MSB data portions and the LSB data portions using the same kernel are then combined by the post-processor 528.

In order to perform such an operation, a step value of 1 in the X direction and a step value of 1 in the Y direction may be used. An MSB portion of a 16 bit data is first processed followed by a LSB portion of the 16 bit data is subsequently processed. A kernel such as kernel 700D having sparsity of 2 in X direction and sparsity of 1 in Y direction may be used for convolving with both the MSB portion and the LSB portion.

After the output values are obtained for 8 bit MSB and LSB data portions, the post-processor 528 performs the process of merging the corresponding two output values to obtain output values for 16 bit data.

Figure 8C:
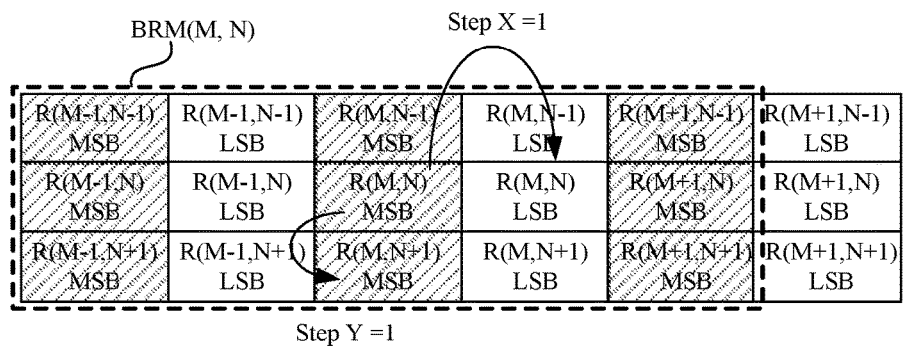
FIG. 8C is a diagram illustrating processing of 16 bit image data by splitting into two 8 bit image data and performing convolution on the split image data, according to one embodiment.

The examples of FIGS. 8A through 8C are merely illustrative. Various other step values and sparsity values may be used to perform convolution on the input data of various number of channels taking into account various selections of neighboring pixels. For example, the step values in X and Y direction as well the sparsity value in X and Y direction may be 2 to perform convolution on pixel data in Bayer pattern.

Operation for Storing Output Values in Output Buffer

FIG. 9 is a diagram illustrating storing of output values of convolution in designated locations of the output buffer 524, according to one embodiment. The computation core 516 may not generate output values of different channels in an interleaved manner. That is, the computation core 516 may, for example, output values for a single output channel at a time. However, by storing the output values at pre-designated locations of the output buffer 524, the output values of multiple values can be stored in the output buffer 524 in an interleaved manner.

For example, when three output channels are generated as the result of convolution, the output values of the first channels are stored in the first column, fourth column, seventh column and so forth of the output buffer 524, whenever these output values become available through computation at the computation core 516. Similarly, the output values of the second channels are stored in the second column, fifth column, eighth column and so forth of the output buffer 524.

In contrast, the readout from the output buffer 524 may be sequential from the first column through the last column of the output buffer 524 in a raster fashion, producing an output with output values of multiple channels interleaved.

Kernel Splitting

A kernel for performing the convolution operation may include filter elements with a larger number of bits than what the multiplier circuits FE0 through FEN can handle. For example, the multiplier circuits FE0 through FEN can each receive and process filter elements of 8 bits whereas filter elements of a kernel may be 16 bit data. The convolution engine 414 can use such a kernel by dividing different bit portions of the kernel into two kernels.

For example, two separate kernels with 8 bit filter elements may be generated from the kernel with 16 bit filter elements: one 8 bit kernel including 8 highest significant bits (HSB) of the filter elements and another 8 bit kernel including 8 lowest significant bits (LSB) of the filter elements. The multiplier circuits FE0 through FEN may store 8 bit filter elements from both 8 bit kernels, and perform multiplication of the corresponding data values of data 508 with both 8 bit kernels.

The output values 515 of the multiplication are stored in predetermined locations of the output buffer 524. Then the post-processor 528 reads an output value generated by multiplying LSB filter element with a pixel value and another output value generated by multiplying a corresponding MSB filter element with the same pixel value, and then merges the two output values to generate an output 428 representing the result of the convolution using 16 bit kernel.

Patch Mode Operation

The input data 422 may include a plurality of image patches. The convolution engine 414 may operate in a patch mode where the convolution operation is performed on each of the image patches instead of the entire input data 422. In the patch mode, multiple patches of images may be stitched together for form a larger image, but each of the image patch is treated as a separate image. The same kernel can be applied to all the patches. Alternatively, different kernels may be applied to different patches.

To operate in the patch mode, the datapath router 506 may select and send pixel values of a single patch to the computation core 516. Alternatively, pixel values for multiple patches are sent to the computation core 516 but the post-processor 528 identifies output values 513 associated with each patch and generate outputs 428 for each patch.

When operating in the patch mode, the convolution engine 414 may receive information on the starting pixel location of each patch as well as the ending pixel location of each patch or the dimension of each patch to enable components of the convolution engine 414 to operate accordingly.

Example Method of Performing Convolution Process

Figure 10:
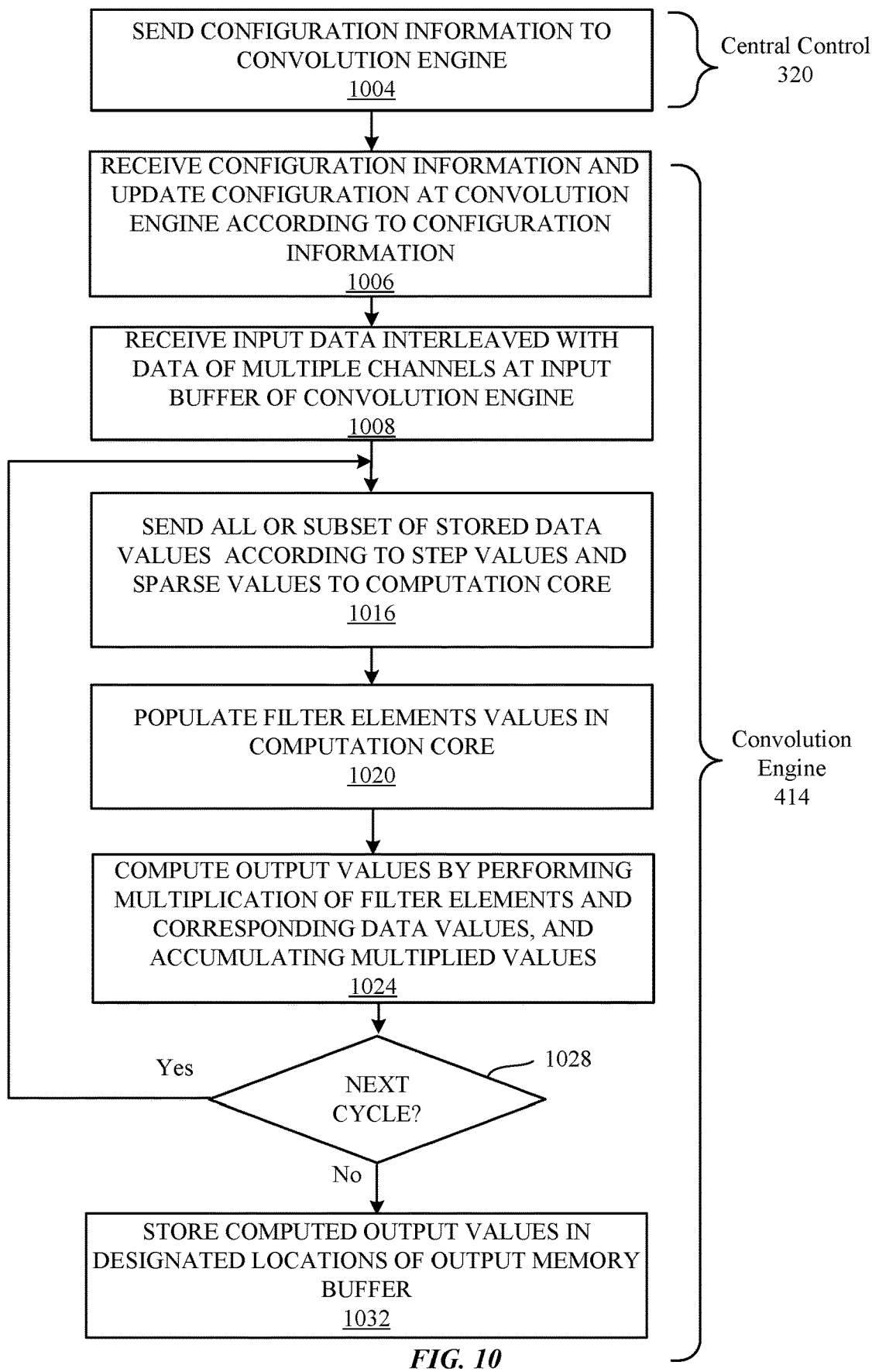
FIG. 10 is a flowchart illustrating a method of performing a convolution operation, according to one embodiment.

FIG. 10 is a flowchart illustrating a method of performing convolution operation, according to one embodiment. First, the central control 320 sends 1004 the configuration information to the convolution engine 414. The configuration information may include, but is not limited to, sparsity values, step values, mapping between pixel data values and filter elements, operation to be performed at the compressor 510 of the convolution engine 414, the number of channels in input data or output values, and enabling/selection of post-processing operations to be performed at the post-processor 528.

After receiving the configuration information, the configuration of the convolution engine 414 is updated 1006 according to the configuration information to perform operations as described in the configuration information.

The convolution engine 414 receives 1008 input data interleaved with data of multiple channels at its input buffer circuit 502. For example, the input data may pixel data that is interleaved so that a row of input data includes a repeating sequence of red, green and blue pixel data. The input data may be other types of data such as HOG data or output values of the convolution engine in a previous cycle. The received input data is stored in the input buffer circuit 502.

In the convolution engine 414, all or subsets of the data values are selected and sent 1016 to the multiplier circuits FE0 through FEN of the computation core 516 according to the step values and sparse values. The step values may be set so that only the data values of one channel are selected as the center data (e.g., center pixel) and forwarded to the multiplier circuits of the computation core. The sparse values indicate which of the data values neighboring the center data are sent to the computation core 516 for computing the output values.

The multiplier circuits FE0 through FEN of the computation core 516 are also populated 1020 with filter element values received from the filter storage 520. The filter element values are multiplied with corresponding data values received from the input buffer circuit 502 via the datapath router 506. In one embodiment, each of the filter element values is associated with one data value for multiplication.

Output values are computed 1024 by performing multiplication of the populated filter elements and corresponding data values, and then accumulating the multiplied values at the computation core 516. In some embodiments, minimum values, maximum values or median values among a subset of the multiplied values are selected instead of accumulating the multiplied values to obtain the output values.

It is determined 1028 if a next cycle is to be performed. If so, the process returns to sending 1016 a subset of stored data values to the computation core 516. The subset of stored data values or kernels in the cycle is different from the stored data values in the prior cycle. The output values are updated with the updated data values and/or kernels in the cycle.

If there is no subsequent scan or cycle, the process proceeds to storing 1032 the output values in designated locations of an output buffer 524 of the convolution engine 414. In one embodiment, the locations of the output buffer 524 are pre-assigned to output values of certain output channels so that output data of different output channels are interleaved in a row of the output buffer 524.

After storing the output values in the output buffer 524, further post-processing such as normalized cross correlation may be performed on the stored output values by the post-processor 528. In one embodiment, the location that has the maximal score based on the normalized cross correlation can be detected. Such location indicates the best match shift between an image patch and a kernel.

The process as illustrated in FIG. 10 is merely illustrative and various changes can be made to the process. For example, instead of performing sending 1016 of stored data values and populating 1020 the filter elements in series, these operations may be performed in parallel. Further, the convolution engine 414 may be capable of performing only a single cycle operation, in which case, the step 1028 does not involve checking for a next cycle.

The stored data values can be used for various operations including, but not limited to, performing further filtering on the input data, recognizing objects of features on image data, and performing predictions or inference based on the input data. Embodiments enable such operations to be performed more efficiently with less power consumption.

It should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. A convolution engine, comprising:
    an input buffer circuit configured to receive and store data values of a plurality of channels of input data in an interleaved manner;
    a datapath switch circuit coupled to the input buffer circuit and configured to retrieve a group of the data values stored in the input buffer circuit including a center data value and one or more neighboring data values separated from the center data value by one or more step values as defined by configuration information, a portion of the data values between the center data value and the one or more neighboring values being skipped when the group of the data values is retrieved; and
    a computation core circuit coupled to the datapath switch circuit and configured to:
        receive the group of the data values from the datapath switch circuit and filter elements of a kernel for performing a convolution operation, and
        multiply each data value of the group of the data values with a corresponding filter element to obtain multiplied values.

2. The convolution engine of claim 1, further comprising an output buffer coupled to the computation core circuit, the output buffer configured to store output values from the computation core circuit.

3. The convolution engine of claim 2, wherein the output values stored in the output buffer are of a plurality of output channels in an interleaved manner.

4. The convolution engine of claim 1, further comprising:
    a filter storage configured to store the filter elements; and
    a filter switch circuit coupled to the filter storage and the computation core circuit, the filter switch circuit configured to retrieve the filter elements from the filter storage and provide the filter elements to the computation core circuit.

5. The convolution engine of claim 1, wherein the input buffer circuit stores (i) in a predetermined row and a column of memory location, first data values for a first subset of bits of a data unit in the input data, and (ii) in the row and another column adjacent to the column storing the first subset of bits, a second data value for a second subset of bits of the data unit.

6. The convolution engine of claim 5, wherein the first subset of the bits is most significant bits of the data, and the second subset of the bits is least significant bits of the data.

7. The convolution engine of claim 1, wherein the computation core circuit is further configured to process subsets of the multiplied values by one of (i) accumulating of the subsets of the multiplied values to obtain an output value or (ii) selecting one of the multiplied values as an output value.

8. The convolution engine of claim 7, further comprising a post-processing circuit coupled to the computation core circuit, the post-processing circuit configured to perform normalized cross correlation on the output value.

9. The convolution engine of claim 1, wherein the group of the data values multiplied by the computation core circuit in a cycle define a portion of an image.

10. A method of performing convolution, comprising:
    storing, by an input buffer circuit of a convolution engine, data values of a plurality of channels of input data in an interleaved manner;
    retrieving, by a datapath switch circuit of the convolution engine and from the input buffer circuit, a group of the data values stored in the input buffer circuit including a center data value and one or more neighboring data values separated from the center data value by one or more step values as defined by configuration information, a portion of the data values between the center data value and the one or more neighboring values skipped when the group of the data values is retrieved;
    receiving, by a computation core circuit of the convolution engine, the group of the data values from the datapath switch circuit and filter elements of a kernel for performing a convolution operation; and
    multiplying, by the computation core circuit, each data value of the group of the data values with a corresponding filter element to obtain multiplied values.

11. The method of claim 10, further comprising, by an output buffer of the convolution engine, storing output values of the computation core circuit, and wherein the output values stored in the output buffer are of a plurality of output channels in an interleaved manner.

12. The method of claim 10, further comprising:
    storing, by a filter storage of the convolution engine, the filter elements of the kernel;
    retrieving, by a filter switch circuit of the convolution engine, the filter elements from the filter storage; and
    providing, by the filter switch circuit, the filter elements to the computation core circuit.

13. The method of claim 10, wherein the input buffer circuit stores (i) in a predetermined row and a column of memory location, first data values for a first subset of bits of a data unit in the input data, and (ii) in the row and another column adjacent to the column storing the first subset of bits, a second data value for a second subset of bits of the data unit.

14. The method of claim 13, wherein the first subset of the bits is most significant bits of the data, and the second subset of the bits is least significant bits of the data.

15. The method of claim 10, further comprising, by the computation core circuit, processing subsets of the multiplied values by the computation core circuit includes one of (i) accumulating of the subsets of the multiplied values to obtain an output value or (ii) selecting one of the multiplied values as an output value.

16. The method of claim 15, further comprising, by a post-processing circuit of the convolution engine, performing a normalized cross correlation on the output value.

17. The method of claim 10, wherein the group of the data values multiplied by the computation core circuit in a cycle define a portion of an image.

18. An image signal processor, comprising:
- an input buffer circuit configured to receive and store data values of a plurality of channels of input data in an interleaved manner;
- a datapath switch circuit coupled to the input buffer circuit and configured to retrieve a group of the data values stored in the input buffer circuit including a center data value and one or more neighboring data values separated from the center data value by one or more step values as defined by configuration information, a portion of the data values between the center data value and the one or more neighboring values skipped when the group of the data values is retrieved; and
- a computation core circuit coupled to the datapath switch circuit and configured to:
- receive the group of the data values from the datapath switch circuit and filter elements of a kernel for performing a convolution operation, and
- multiply each data value of the group of data values with a corresponding filter element to obtain multiplied values.

19. The image signal processor of claim 18, further comprising an output buffer coupled to the computation core circuit, the output buffer configured to store output values from the computation core circuit.

20. The image signal processor of claim 19, wherein the output values stored in the output buffer are of a plurality of output channels in an interleaved manner.

* * * * *